(12) United States Patent
Lee

(10) Patent No.: US 10,183,697 B2
(45) Date of Patent: Jan. 22, 2019

(54) SYSTEM AND METHOD FOR CONTROLLING AUTONOMOUS STEERING

(71) Applicant: MANDO CORPORATION, Pyeongtaek-si, Gyeonggi-do (KR)

(72) Inventor: Sung Gun Lee, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 185 days.

(21) Appl. No.: 15/353,528

(22) Filed: Nov. 16, 2016

(65) Prior Publication Data

US 2017/0144705 A1    May 25, 2017

(30) Foreign Application Priority Data

Nov. 20, 2015    (KR) .......................... 10-2015-0162986

(51) Int. Cl.
*B62D 5/04* (2006.01)
*B62D 15/02* (2006.01)

(52) U.S. Cl.
CPC .......... *B62D 15/025* (2013.01); *B62D 5/046* (2013.01); *B62D 15/021* (2013.01); *B60W 2710/20* (2013.01)

(58) Field of Classification Search
CPC .... B62D 15/021; B62D 15/025; B62D 5/046; B60W 2710/20
See application file for complete search history.

(56) References Cited

U.S. PATENT DOCUMENTS

| | | | | |
|---|---|---|---|---|
| 6,832,144 B2 * | 12/2004 | Momiyama | ............ | B62D 6/002 180/446 |
| 6,999,862 B2 * | 2/2006 | Tamaizumi | ............ | B62D 5/046 180/446 |
| 7,966,114 B2 * | 6/2011 | Yamazaki | .............. | B62D 6/008 180/443 |
| 7,974,752 B2 * | 7/2011 | Yamashita | ........... | B62D 5/0463 701/41 |
| 8,306,702 B2 * | 11/2012 | Suzuki | ................. | B62D 5/0466 180/400 |
| 9,242,670 B2 * | 1/2016 | Endo | ..................... | B62D 5/0466 |
| 9,387,876 B2 * | 7/2016 | Kojo | ...................... | B62D 6/008 |
| 9,802,644 B2 * | 10/2017 | Nakamura | ............. | B62D 6/008 |
| 9,896,122 B2 * | 2/2018 | Endo | ..................... | B62D 5/0466 |
| 9,919,734 B2 * | 3/2018 | Kitazume | ............ | B62D 5/0472 |
| 2003/0141139 A1 * | 7/2003 | Shimizu | ................. | B62D 5/065 180/422 |
| 2004/0068353 A1 * | 4/2004 | Momiyama | ............ | B62D 5/008 701/41 |
| 2005/0182541 A1 * | 8/2005 | Tamaizumi | ............ | B62D 5/046 701/41 |

(Continued)

*Primary Examiner* — Peter D Nolan
(74) *Attorney, Agent, or Firm* — Hauptman Ham, LLP

(57) ABSTRACT

The present embodiments relate to a system and a method for controlling autonomous steering according to a required torque from a driver assistance system, in which when outputting a driving current by the required torque, a compensation current is output by applying gains according to a car speed, steering angle, steering angle speed, and required torque to a variation in torque by the rotation of a steering wheel, thereby achieving autonomous steering with the smooth rotation of the steering wheel without intermittent interruptions even in high friction between the car and the road depending on road conditions.

11 Claims, 9 Drawing Sheets

(56) References Cited

U.S. PATENT DOCUMENTS

| | | | |
|---|---|---|---|
| 2008/0033613 A1* | 2/2008 | Tamaizumi | B62D 5/0463 701/41 |
| 2008/0047775 A1* | 2/2008 | Yamazaki | B62D 5/0463 180/443 |
| 2008/0167780 A1* | 7/2008 | Suzuki | B62D 5/0466 701/42 |
| 2008/0185212 A1* | 8/2008 | Akuta | B62D 6/002 180/400 |
| 2009/0024281 A1* | 1/2009 | Hwang | B62D 5/006 701/42 |
| 2009/0069979 A1* | 3/2009 | Yamashita | B62D 5/0463 701/42 |
| 2012/0296525 A1* | 11/2012 | Endo | B62D 5/0466 701/42 |
| 2014/0019008 A1* | 1/2014 | Nakamura | B62D 6/008 701/42 |
| 2015/0046040 A1* | 2/2015 | Ahn | B62D 5/0463 701/42 |
| 2015/0151783 A1* | 6/2015 | Kitazume | B62D 5/0472 701/42 |
| 2015/0266501 A1* | 9/2015 | Kojo | B62D 5/0463 701/41 |
| 2015/0360717 A1* | 12/2015 | Kim | B62D 5/065 701/41 |
| 2015/0375777 A1* | 12/2015 | Endo | B62D 5/0466 701/41 |
| 2016/0001810 A1* | 1/2016 | Tsubaki | B62D 5/0472 701/42 |
| 2016/0121923 A1* | 5/2016 | Maeda | B62D 5/0463 701/41 |
| 2016/0152267 A1* | 6/2016 | Morimoto | B62D 15/025 701/41 |
| 2016/0200354 A1* | 7/2016 | Kimura | B62D 5/0472 701/42 |
| 2017/0101126 A1* | 4/2017 | Kim | B62D 5/0463 |
| 2017/0120948 A1* | 5/2017 | Kitazume | B62D 5/0409 |
| 2017/0217479 A1* | 8/2017 | Tsubaki | B62D 5/0412 |
| 2017/0297614 A1* | 10/2017 | Minaki | B62D 5/0463 |
| 2017/0320516 A1* | 11/2017 | Kashi | B62D 5/0466 |
| 2018/0111642 A1* | 4/2018 | Endo | B62D 5/0463 |

\* cited by examiner

SYSTEM AND METHOD FOR CONTROLLING AUTONOMOUS STEERING

CROSS REFERENCE TO RELATED APPLICATION

This application claims priority from Korean Patent Application No. 10-2015-0162986, filed on Nov. 20, 2015, which is hereby incorporated by reference for all purposes as if fully set forth herein.

BACKGROUND OF THE INVENTION

1. Field of the Invention

The present embodiments relate to a system and a method for autonomously controlling steering by an in-car system.

2. Description of the Prior Art

A motor-operated steering mechanism is a commonly used car steering mechanism. The motor-operated steering mechanism controls steering in a manner such that when the rotation of a steering wheel generates rotation torque (steering torque), an electric current is applied to a motor in proportion to the generated rotation torque to drive the motor. That is, the motor-operated steering mechanism controls steering based on rotational torque generated when the driver rotates the steering wheel.

Meanwhile, a Driver Assistance System (DAS), which has been studied and developed in recent times for a driver's safety and convenience, controls a car based on information acquired from a sensor mounted on the car in order to assist the driver and also occasionally performs autonomous steering in a car control process.

For example, a Lane Keeping Assist (LKA) system performs autonomous steering to prevent a running car from moving out of a lane of the road. A Traffic Jam Assist (TJA) system controls car speed and steering so that a running car may keep a regular distance from a neighboring car. Further, an Autonomous Driving System also performs autonomous steering control in a car control process.

However, in autonomous steering controlled by a DAS including the LKA system or TJA system, even though steering is controlled with the same torque according to information acquired from the sensor, autonomous steering is not smoothly performed, but is intermittently interrupted depending on a carload or road conditions.

In this case, autonomous steering by the DAS may not be precisely performed and may not be smoothly performed, so that the driver may not rely on the DAS and may feel insecure.

SUMMARY OF THE INVENTION

To solve the foregoing problems, the present embodiments are to provide a system and a method for controlling autonomous steering, in which a compensation current is applied in proportion to a variation in torque caused by the rotation of a steering wheel in controlling steering according to a required torque input from a driver assistance system, thereby performing smooth autonomous steering even with a high carload.

Further, the present embodiments are to provide a system and a method for controlling autonomous steering that output a compensation current by applying gains according to a car speed, steering angle, steering angle speed, and required torque when applying a compensation current that is proportional to the variation in torque, thereby performing autonomous steering that is suitable and safe for driving conditions.

In addition, the present embodiments are to provide a system and a method for controlling autonomous steering, which immediately output a compensation current according to a variation in torque, thereby preventing a decrease in static friction.

One embodiment may provide an autonomous steering control system including: a driving current output unit configured to receive a required torque for autonomous steering and to output a driving current for generating a steering torque corresponding to the received required torque; and a compensation current output unit configured to output a compensation current that is proportional to a variation in torque by the rotation of a steering wheel in steering according to the steering torque, by applying a first gain according to a car speed, a second gain according to a steering angle, and a third gain according to a steering angle speed to the variation in torque.

In the autonomous steering control system, the compensation current output unit may output the compensation current by applying the first gain, which decreases when the car speed increases, to the variation in torque, and may also output the compensation current by applying the first gain, which has a fixed value at a car speed of a preset speed or lower and gradually decreases at a car speed higher than the preset speed, to the variation in torque.

In the autonomous steering control system, the compensation current output unit may output the compensation current by applying the second gain, which is determined to be 0 when the steering angle is out of a range determined by a driver assistance system outputting the required torque for the autonomous steering, to the variation in torque, and may also output the compensation current by applying the third gain, which gradually decreases when an absolute value of the steering angle speed is a preset angular speed or higher, to the variation in torque.

In the autonomous steering control system, the compensation current output unit may output the compensation current by passing the variation in torque, to which at least one of the first gain according to the car speed and the second gain according to the steering angle is applied, through a low pass filter.

Another embodiment may provide an autonomous steering control method including: receiving a required torque for autonomous steering; generating a steering torque according to the required torque; and outputting a compensation current proportional to a variation in torque by the rotation of a steering wheel in steering according to the steering torque, wherein the outputting of the compensation current outputs the compensation current by applying a first gain according to a car speed, a second gain according to a steering angle, and a third gain according to a steering angle speed to the variation in torque.

Still another embodiment may provide an autonomous steering control system including: a torque variation receiver configured to receive a variation in torque by rotation of a steering wheel in steering according to a steering torque; a low pass filter configured to pass the received variation in torque; and a compensation current output unit configured to generate and output a compensation current based on the variation in torque that is via the low pass filter.

In the autonomous steering control system, the compensation current output unit may apply at least one gain of a first gain according to a car speed, a second gain according to a steering angle, and a third gain according to a steering angle speed to the variation in torque.

Here, the compensation current output unit may apply a gain before the variation in torque passes through the low pass filter or may apply a gain after the variation in torque passes through the low pass filter.

Further, some gains may be applied to the variation in torque before the variation in torque passes through the low pass filter and a remaining gain may be applied to the variation in torque after the variation in torque passes through the low pass filter.

According to the present embodiments, there are provided a system and a method for controlling autonomous steering, in which a compensation current is output by applying gains according to a car speed, steering angle, steering angle speed, and required torque to a variation in torque by the rotation of a steering wheel in autonomous steering according to a required torque input by a driver assistance system, thereby performing smooth autonomous steering even in high friction between the car and the road depending on a carload or road conditions.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
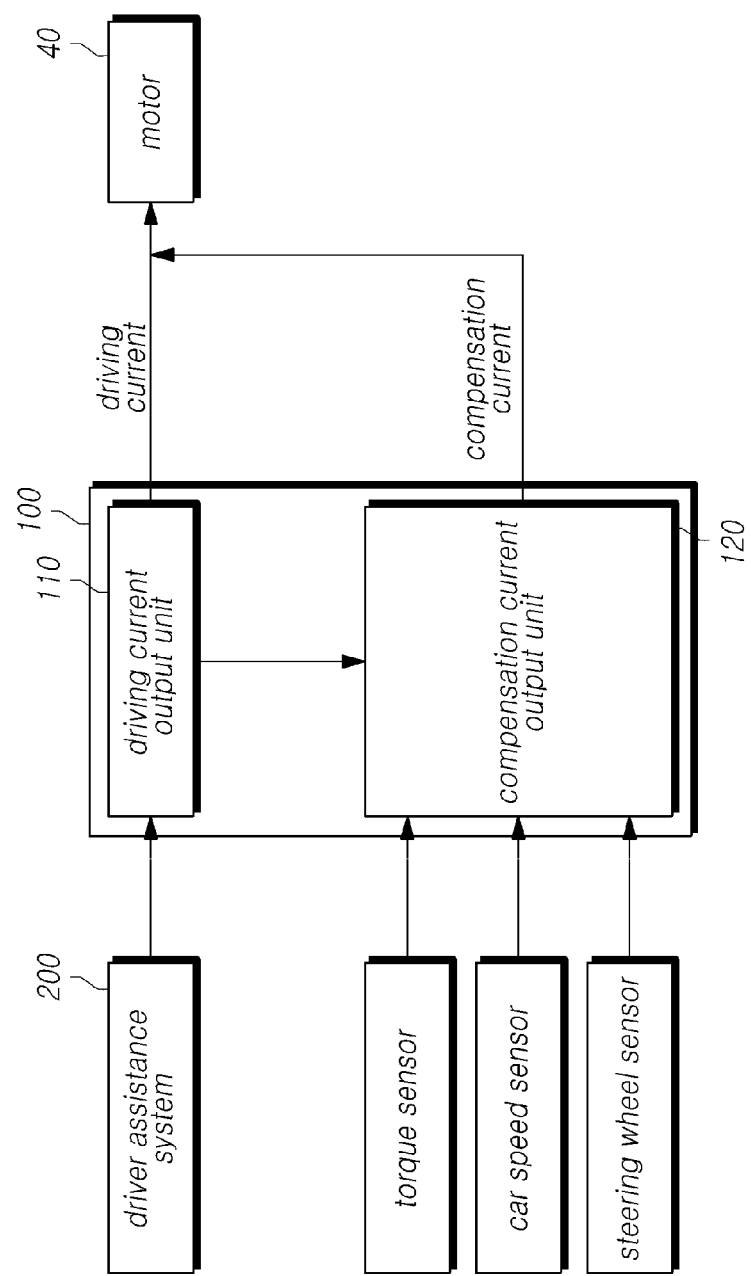
FIG. 1 is a block diagram illustrating a configuration of an autonomous steering control system according to the present embodiments.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a block diagram illustrating a configuration of an autonomous steering control system according to the present embodiments.

Referring to FIG. 1, the autonomous steering control system 100 according to the present embodiments includes a driving current output unit 110 and a compensation current output unit 120.

The driving current output unit 110 receives a required torque from a driver assistance system 200, generates a driving current corresponding to the received required torque, and supplies the driving current to a motor 40.

That is, the driving current output unit 110 generates the driving current, which is used to operate a steering wheel, according to the required torque for the driver assistance system 200 to control a car and supplies the driving current to the motor 40, thereby achieving steering control according to the required torque from the driver assistance system 200.

In the present embodiments, the driver assistance system 200 refers to a driver assistance system 200 including autonomous steering control in a car control process by the driver assistance system 200.

For example, the driver assistance system 200 refers to a Lane Keeping Assist (LKA) system designed to prevent a running car from moving out of a lane thereof of the road or refers to a Traffic Jam Assist (TJA) system that assists a running car to keep a regular distance from a neighboring car in traffic-jam areas.

The driver assistance system 200 determines whether the car needs steering control based on information acquired from a sensor, such as a camera.

For example, when the running car approaches one lane of the road within a certain distance, the LKA system determines that the steering control of the car is needed. Then, the LKA system allows the steering wheel to operate in an opposite direction to the lane that the car approaches so that the car does not move out of the driving lane of the road.

Here, the LKA system calculates a required torque corresponding to a steering control level needed for the car to move from the current position to a specific position of the driving road (for example, the center of the driving road) and transmits the calculated required torque to the driving current output unit 110.

The driving current output unit 110 supplies the driving current according to the required torque, which is received from the driver assistance system 200, to the motor 40 so that autonomous steering is performed according to the required torque from the driver assistance system 200.

Here, even when the driving current output unit 110 supplies, to the motor 40, the driving current corresponding to the required torque from the driver assistance system 200 in order to generate the required torque, steering control may not be smoothly performed, but may be intermittently interrupted in a high carload condition (for example, low-speed driving) or in high friction between the car and the road depending on road conditions.

The present embodiments include the compensation current output unit 120 that outputs a compensation current proportional to a torque variation in order to achieve smooth autonomous steering control even in the above cases.

When the required torque is received from the driver assistance system 200 and the steering wheel operates according to the received required torque, the compensation current output unit 120 outputs a compensation current proportional to a variation in torque generated by the rotation of the steering wheel and supplies the compensation current to the motor 40.

That is, the sum of the driving current output from the driving current output unit 110 and the compensation current proportional to the variation in torque is supplied to the motor 40, thereby performing smooth autonomous steering even in high friction between the car and the road depending on a carload or road conditions.

In outputting the compensation current proportional to the torque variation, the compensation current output unit 120 may output the compensation current by applying gains according to a car speed, steering angle, steering angle speed, and required torque.

For example, when the car is running at low speed (that is, in a case of low car speed corresponding to a high carload condition), the compensation current output unit 120 may output the compensation current by multiplying a car speed gain, which increases with a low car speed, and the torque variation.

That is, a high car speed gain is applied to a torque variation in the case of low car speed and a low car speed gain is applied to a torque variation in a case of a high car speed, thereby applying a high compensation current in a high carload case and applying a low compensation current in a low carload case.

A steering angle gain acts to limit the application of the compensation current according to the range of the steering angle since the steering angle is controlled in a different range according to the kind of the driver assistance system 200 that outputs the required torque.

For example, since the steering angle is not high in autonomous steering by the LKA system or TJA system, the application of a compensation current may be limited with a steering angle gain only in a steering angle range of −90° to +90° and no steering angle gain in the other range. Further, when the steering angle has a wide range, such as an autonomous driving system, the range having a steering angle gain may be set to be wide.

A steering angle speed gain acts to limit the application of the compensation current above a certain steering angle speed since a decrease in friction by smooth autonomous steering may allow the steering wheel to rotate too fast, causing a safety problem.

A required torque gain is a gain that is proportional to the required torque. However, since the required torque itself is input as a high value, the required torque gain is not necessarily proportional to the required torque and needs to be tuned to the car type.

The foregoing car speed gain, steering angle gain, steering angle speed gain, and required torque gain may be tuned to a car type and may be applied in various manners, without being limited to the foregoing examples.

Hereinafter, the compensation current output unit 120 according to the present embodiments is described in detail with reference to FIG. 2.

Figure 2:
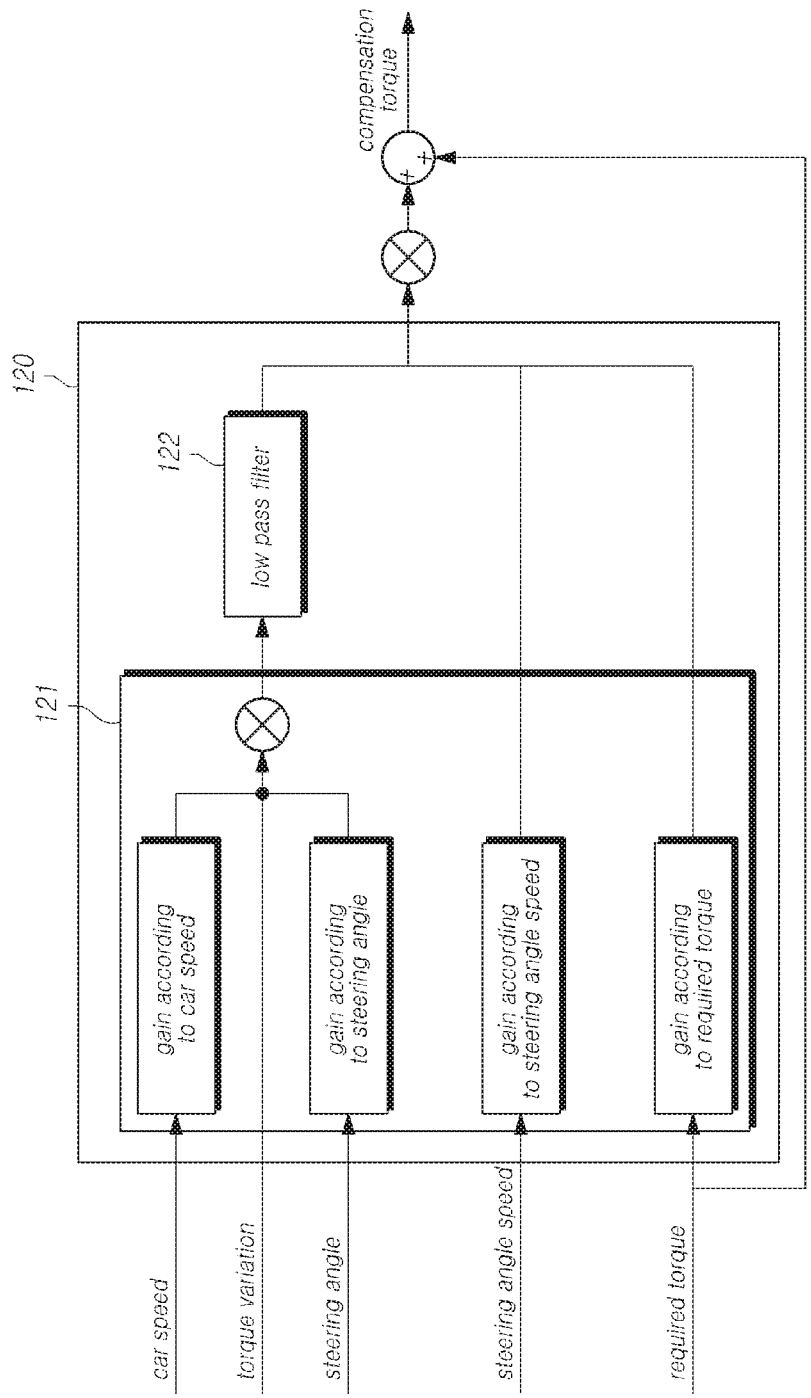
FIG. 2 is a block diagram illustrating a detailed configuration of a compensation current output unit of the autonomous steering control system according to the present embodiments.

FIG. 2 illustrates a detailed configuration of the compensation current output unit 120 according to the present embodiments.

Referring to FIG. 2, the compensation current output unit 120 according to the present embodiments may include a gain application unit 121 and a low pass filter 122.

The gain application unit 121 receives an input of a torque variation and outputs a compensation current proportional to the torque variation. In outputting the compensation current, the gain application unit 121 may output the compensation current by applying gains according to a car speed, steering angle, steering angle speed, and required torque.

That is, when the steering wheel operates according to the required torque from the driver assistance system 200, the gain application unit 121 may apply a gain, which is determined according to a car speed, steering angle, steering angle speed, and required torque, to the torque variation by the rotation of the steering wheel to output the compensation current, thereby performing smooth autonomous steering even in a high carload condition or in high friction between the car and the road depending on road conditions.

The gain application unit 121 may output a compensation current that is proportional to the torque variation as it is and may output the compensation current by applying a car speed gain.

A car speed gain is a gain that increases with a low car speed. In the case of a low car speed corresponding to high friction between the car and the road, the gain application unit 121 may multiply the torque variation by a high car speed gain to output the compensation current.

Figure 3:
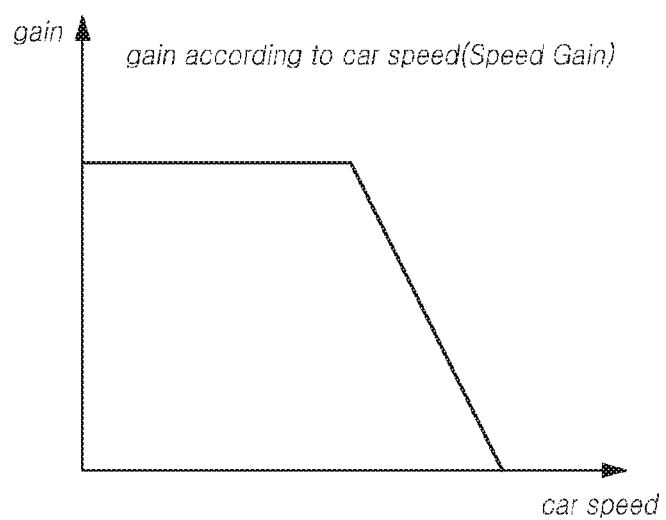
FIG. 3 and FIG. 4 are graphs illustrating examples of a car speed gain according to the present embodiments.
Figure 4:
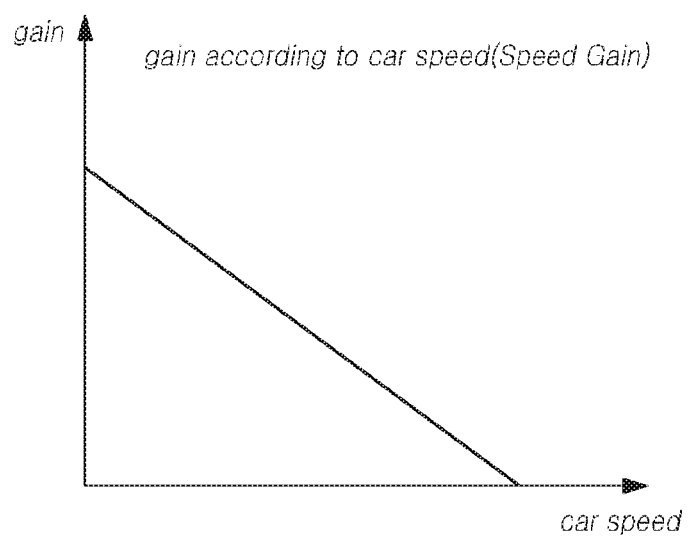

FIG. 3 and FIG. 4 illustrate examples of a car speed gain according to the present embodiments.

Referring to FIG. 3, a car speed gain may be a value that is fixed at a certain car speed or lower and gradually decreases at a car speed that is higher than the certain speed. That is, when the car allows autonomous steering while running at a low speed, the fixed gain is applied to the torque variation at the certain speed or lower to apply a high compensation current.

Referring to FIG. 4, a car speed gain may be a value that gradually decreases with an increase in car speed. That is, a low car speed has a high car speed gain, while a high car speed has a low car speed gain. Thus, a high compensation current is applied in high friction between the car and the road by a low car speed, while a low compensation current is applied in relatively low friction between the car and the road by a high car speed.

Therefore, according to the present embodiments, a gain according to a car speed, which has influence on friction between the car and the road, is multiplied by the torque variation to output the compensation current, thereby performing smooth autonomous steering even in high friction between the car and the road.

The gain application unit 121 may also apply a steering angle gain to the torque variation to output the compensation current.

A steering angle gain acts to limit the application of the compensation current according to the range of the steering angle since the steering angle is controlled in a different range according to the kind of the driver assistance system 200 that outputs the required torque for autonomous steering.

That is, when the driver assistance system 200 does not require a wide steering angle, such as an LKA system or TJA system, the range having a steering angle gain may be set to be narrow. In a system requiring a wide steering angle control, such as an autonomous driving system, the range having a steering angle gain may be set to be wide.

Figure 5:
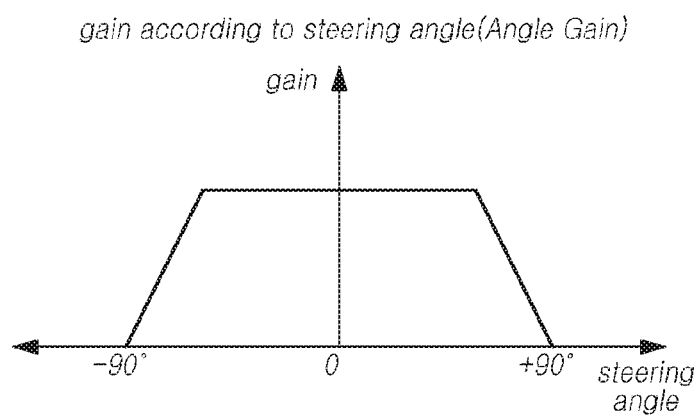
FIG. 5 and FIG. 6 are graphs illustrating examples of a steering angle gain according to the present embodiments.
Figure 6:
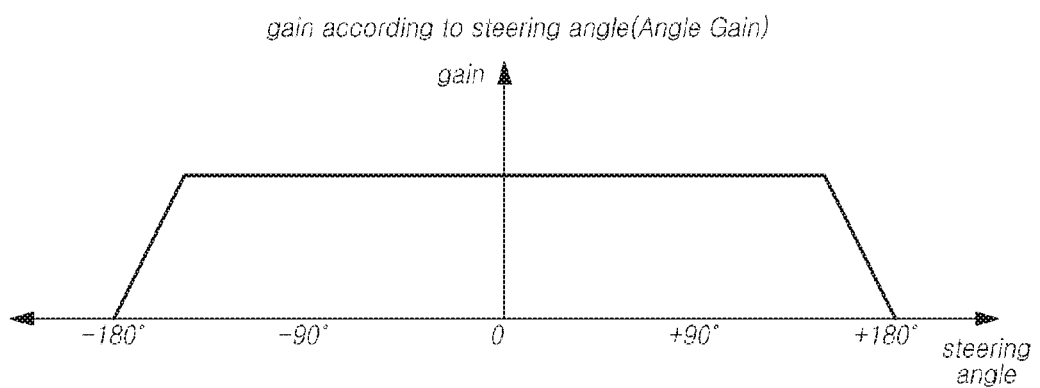

FIG. 5 and FIG. 6 illustrate examples of a steering angle gain according to the present embodiments. FIG. 5 illustrates autonomous steering by an LKA system or TJA system, and FIG. 6 illustrates autonomous steering by an autonomous driving system.

Referring to FIG. 5, in a system not requiring a wide steering angle control, such as the LKA system, a steering angle gain is allowed only in a steering angle range of −90° to +90° and no steering angle gain is allowed in the other range, thereby outputting the compensation current only in autonomous steering control by the LKA system.

Referring to FIG. 6, in a system requiring a wide steering angle control, such as an autonomous driving system, a steering angle gain is allowed in a steering angle range of −180° to +180°, thereby outputting the necessary compensation current in autonomous steering control for autonomous driving.

The gain application unit 121 may also apply a steering angle speed gain to the torque variation to output the compensation current.

A steering angle speed gain acts to limit the application of the compensation current according to a steering angle speed since a decrease in friction by the application of the compensation current that is proportional to the torque variation according to the rotation of the steering wheel may allow the smooth rotation of the steering wheel, resulting in a rotation of the steering wheel that is too fast, thereby causing a safety problem.

For example, when the steering angle speed is a certain angular speed or above, a steering angle speed gain is set to 0, thereby limiting the application of the compensation current that is proportional to the torque variation.

Figure 7:
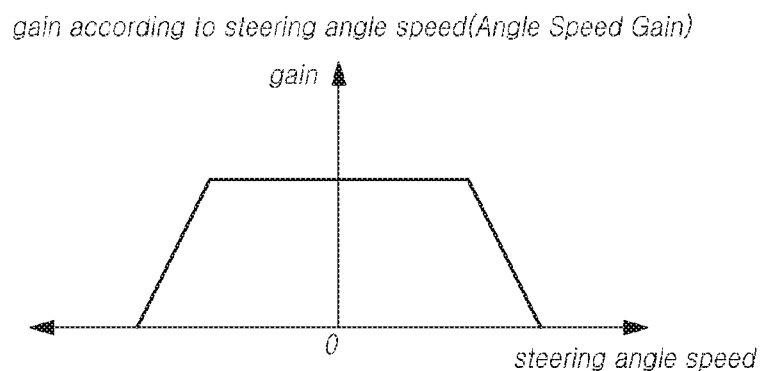
FIG. 7 is a graph illustrating an example of a steering angle speed gain according to the present embodiments.

FIG. 7 illustrates an example of a steering angle speed gain according to the present embodiments. Referring to FIG. 7, a steering angle speed gain is allowed only when the steering angle speed is within a certain angular speed.

Therefore, when the steering angle speed is out of the certain angular speed, the compensation current is not output by the steering angle speed gain, thereby preventing the steering wheel from rotating too fast in autonomous steering according to the required torque from the driver assistance system 200. That is, the compensation current is applied to decrease friction, thus achieving smooth autonomous steering, while preventing the too fast rotation of the steering wheel that is caused by an excessive decrease in friction.

The gain application unit 121 may also apply a required torque gain to the torque variation to output the compensation current.

A required torque gain is a gain that is proportional to the required torque input from the driver assistance system 200. However, since a high required torque is input, the required torque gain does not necessarily increase in proportion to the required torque and needs to be tuned to a car type.

Figure 8:
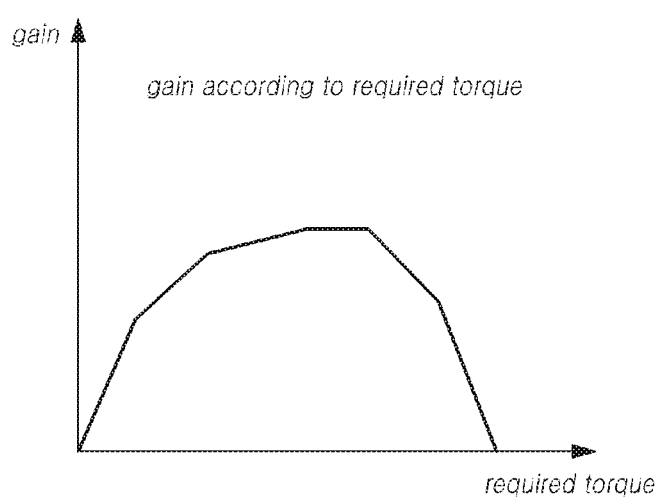
FIG. 8 is a graph illustrating an example of a required torque gain according to the present embodiments.

FIG. 8 illustrates an example of a required torque gain according to the present embodiments. As illustrated in FIG. 8, a required torque gain basically has a value proportional to the required torque but is not necessarily set to be proportional to the required torque.

Meanwhile, the compensation current output unit 120 according to the present embodiments may include the low pass filter 122.

The low pass filter 122 functions to delay a response by allowing a torque variation component to pass therethrough in outputting the compensation current according to the torque variation.

The low pass filter 122 passes a low-frequency component of the torque variation component to delay a response, thereby preventing a decrease in static friction caused by the compensation current immediately output whenever the torque variation of the steering wheel occurs.

The low pass filter 122 may be disposed between a receiving terminal, to which the torque variation is input, and an output terminal, at which the compensation current based on the torque variation is generated.

That is, after the torque variation passes through the low pass filter 122, the compensation current is generated based on the torque variation.

When the low pass filter 122 is included, the gains applied to the torque variation may be applied before or after the torque variation passes through the low pass filter 122.

Alternatively, some gains may be applied before the torque variation passes through the low pass filter 122 and the other gains may be applied after the torque variation passes through the low pass filter 122.

When some gains are applied to the torque variation that has not passed through the low pass filter 122, the low pass filter 122 may multiply gains that need to be relatively delayed by the torque variation and may allow the torque variation to pass therethrough.

For example, the low pass filter 122 may pass the torque variation to which a car speed gain has been applied or may pass the torque variation to which a steering angle gain has been applied. Alternatively, the low pass filter 122 may pass the torque variation to which a car speed gain and a steering angle gain have been applied.

The low pass filter 122 passes the low-frequency component of the torque variation component to delay a response, thereby preventing a decrease in static friction caused by the compensation current immediately output whenever the torque variation occurs.

Therefore, the torque variation is allowed to pass through the low pass filter 122 to prevent the immediate application of the compensation current, thereby achieving the smoother and more natural rotation of the steering wheel by autonomous steering.

Further, a gain that needs to be relatively delayed is applied to the torque variation that has not passed through the low pass filter 122, and a gain may be applied based on the low pass filter 122 in various manners.

Figure 9:
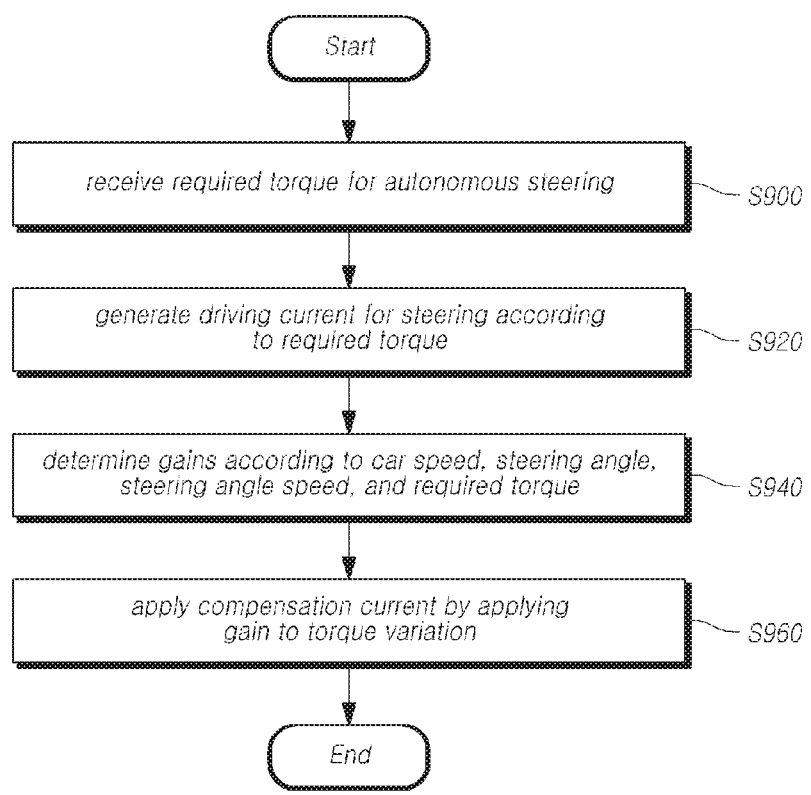
FIG. 9 is a flowchart illustrating a process of an autonomous steering control method according to the present embodiments.

FIG. 9 is a flowchart illustrating a process of an autonomous steering control method according to the present embodiments.

Referring to FIG. 9, the autonomous steering control system 100 according to the present embodiments receives a required torque for autonomous steering from the driver assistance system 200 (S900).

When the required torque for autonomous steering is received, the autonomous steering control system 100 generates a driving current for operating the steering wheel according to the received required torque and supplies the driving current to the motor 40 (S920).

Here, steering control is autonomously performed according to the required torque from the driver assistance system 200, while autonomous steering control according to the required torque may not be smoothly performed in high friction between the car and the road due to a carload or the like.

Therefore, the present embodiments apply a compensation current that is proportional to a torque variation caused by the rotation of the steering wheel in autonomous steering according to the required torque to decrease friction, thus performing smooth autonomous steering. Further, in applying the compensation current, gains according to a car speed, steering angle, steering angle speed, and required torque may be applied to the torque variation to apply the compensation current.

The autonomous steering control system 100 determines gains according to a car speed, steering angle, steering angle speed, and required torque (S940).

A car speed gain has a higher value in a case of lower car speed that corresponds to high friction between the car and the road. A steering angle gain is a gain to limit the application of the compensation current when a steering angle is out of a steering angle range by the driver assistance system 200. A steering angle speed gain is a gain to limit the application of the compensation current in order to prevent the too fast rotation of the steering wheel by a decrease in friction when a steering angle speed is a certain angular speed or above. A required torque gain is a gain that is proportional to the required torque and needs to be tuned to a car type.

The autonomous steering control system 100 applies the determined gains according to a car speed, steering angle, steering angle speed, and required torque to the torque variation to output the compensation current (S960).

Therefore, the autonomous steering control system 100 additionally applies the compensation current in view of friction between the car and the road in autonomous steering according to the required torque from the driver assistance system 200, thereby allowing the smooth rotation of the steering wheel without intermittent interruptions even in high friction between the car and the road depending on a carload or road conditions.

Although the exemplary embodiments of the present invention have been described for illustrative purposes, those skilled in the art will appreciate that various modifications and substitutions are possible, without departing from the scope and spirit of the invention as disclosed in the accompanying claims. Therefore, the exemplary embodiments disclosed in the present invention are intended to illustrate the scope of the technical idea of the present invention, and the scope of the present invention is not limited by the exemplary embodiments.

What is claimed is:

1. An autonomous steering control system comprising:
a driving current output unit configured to receive a required torque for autonomous steering and to output a driving current for generating a steering torque corresponding to the received required torque; and
a compensation current output unit configured to output a compensation current proportional to a variation in torque by rotation of a steering wheel in steering according to the steering torque, by applying a first gain according to a car speed, a second gain according to a steering angle, and a third gain according to a steering angle speed to the variation in torque,
wherein the compensation current output unit outputs the compensation current by applying the first gain, which decreases with the car speed increasing, to the variation in torque.

2. The autonomous steering control system of claim 1, wherein the compensation current output unit passes the variation in torque, to which at least one of the first gain according to the car speed and the second gain according to the steering angle is applied, through a low pass filter.

3. The autonomous steering control system of claim 1, wherein the driving current output unit receives the required torque for the autonomous steering from a driver assistance system.

4. An autonomous steering control system comprising:
a driving current output unit configured to receive a required torque for autonomous steering and to output a driving current for generating a steering torque corresponding to the received required torque; and
a compensation current output unit configured to output a compensation current proportional to a variation in torque by rotation of a steering wheel in steering according to the steering torque, by applying a first gain according to a car speed, a second gain according to a steering angle, and a third gain according to a steering angle speed to the variation in torque,
wherein the compensation current output unit outputs the compensation current by applying the first gain, which has a fixed value at a car speed of a preset speed or lower and gradually decreases at a car speed higher than the preset speed, to the variation in torque.

5. An autonomous steering control system comprising:
a driving current output unit configured to receive a required torque for autonomous steering and to output a driving current for generating a steering torque corresponding to the received required torque; and
a compensation current output unit configured to output a compensation current proportional to a variation in torque by rotation of a steering wheel in steering according to the steering torque, by applying a first gain according to a car speed, a second gain according to a steering angle, and a third gain according to a steering angle speed to the variation in torque,
wherein the compensation current output unit outputs the compensation current by applying the second gain, which is determined to be 0 when the steering angle is out of a range determined by a driver assistance system outputting the required torque for the autonomous steering, to the variation in torque.

6. An autonomous steering control system comprising:
a driving current output unit configured to receive a required torque for autonomous steering and to output a driving current for generating a steering torque corresponding to the received required torque; and
a compensation current output unit configured to output a compensation current proportional to a variation in torque by rotation of a steering wheel in steering according to the steering torque, by applying a first gain according to a car speed, a second gain according to a steering angle, and a third gain according to a steering angle speed to the variation in torque,
wherein the compensation current output unit outputs the compensation current by applying the third gain, which gradually decreases when an absolute value of the steering angle speed is a preset angular speed or higher, to the variation in torque.

7. An autonomous steering control method comprising:
receiving a required torque for autonomous steering;
generating a steering torque according to the required torque; and
outputting a compensation current proportional to a variation in torque by rotation of a steering wheel in steering according to the steering torque,
wherein the outputting of the compensation current outputs the compensation current by applying a first gain according to a car speed, a second gain according to a steering angle, and a third gain according to a steering angle speed to the variation in torque, and wherein the outputting of the compensation current outputs the compensation current by applying the first gain, which is inversely proportional to the car speed, to the variation in torque.

8. The autonomous steering control method of claim 7, wherein the outputting of the compensation current comprises passing the variation in torque, to which at least one of the first gain according to the car speed and the second gain according to the steering angle is applied, through a low pass filter.

9. An autonomous steering control system comprising:
a torque variation receiver configured to receive a variation in torque by rotation of a steering wheel in steering according to a steering torque;
a low pass filter configured to pass the received variation in torque; and
a compensation current output unit configured to generate and output a compensation current based on the variation in torque that is via the low pass filter,
wherein the compensation current output unit applies at least one gain of a first gain according to a car speed, a second gain according to a steering angle, and a third gain according to a steering angle speed to the variation in torque and generates the compensation current based on the variation in torque to which the gain is applied, and
wherein the compensation current output unit applies at least one gain of the first gain, the second gain, and the third gain to the variation in torque that is via the low pass filter.

10. An autonomous steering control system comprising:
a torque variation receiver configured to receive a variation in torque by rotation of a steering wheel in steering according to a steering torque;
a low pass filter configured to pass the received variation in torque; and
a compensation current output unit configured to generate and output a compensation current based on the variation in torque that is via the low pass filter,
wherein the compensation current output unit applies at least one gain of a first gain according to a car speed, a second gain according to a steering angle, and a third gain according to a steering angle speed to the variation in torque and generates the compensation current based on the variation in torque to which the gain is applied, and
wherein the compensation current output unit applies at least one gain of the first gain, the second gain, and the third gain to the variation in torque and passes the variation in torque, to which the gain is applied, through the low pass filter.

11. An autonomous steering control system comprising:
a torque variation receiver configured to receive a variation in torque by rotation of a steering wheel in steering according to a steering torque;
a low pass filter configured to pass the received variation in torque; and
a compensation current output unit configured to generate and output a compensation current based on the variation in torque that is via the low pass filter,
wherein the compensation current output unit applies at least one gain of a first gain according to a car speed, a second gain according to a steering angle, and a third gain according to a steering angle speed to the variation in torque and generates the compensation current based on the variation in torque to which the gain is applied, and
wherein the compensation current output unit applies a part of the first gain, the second gain, and the third gain to the variation in torque that is not via the low pass filter and applies a remaining part to the variation in torque that is via the low pass filter.

* * * * *